(12) United States Patent
McLaughlin et al.

(10) Patent No.: US 9,898,755 B2
(45) Date of Patent: Feb. 20, 2018

(54) SYSTEM AND METHOD FOR VERIFYING NON-HUMAN TRAFFIC

(71) Applicant: DoubleVerify, Inc., New York, NY (US)

(72) Inventors: Matthew McLaughlin, Severna Park, MD (US); Roy Kalman Rosenfeld, Jerusalem (IL); Aaron Doades, New York, NY (US)

(73) Assignee: Double Verify, Inc., New York, NY (US)

( * ) Notice: Subject to any disclaimer, the term of this patent is extended or adjusted under 35 U.S.C. 154(b) by 10 days.

(21) Appl. No.: 14/530,334

(22) Filed: Oct. 31, 2014

(65) Prior Publication Data

US 2015/0281263 A1 Oct. 1, 2015

Related U.S. Application Data

(60) Provisional application No. 62/026,196, filed on Jul. 18, 2014.

(51) Int. Cl.
*G06Q 30/02* (2012.01)
*G06F 17/30* (2006.01)
*H04L 29/06* (2006.01)

(52) U.S. Cl.
CPC .... *G06Q 30/0248* (2013.01); *G06F 17/30864* (2013.01); *G06Q 30/0201* (2013.01); *G06Q 30/0251* (2013.01); *G06Q 30/0277* (2013.01); *H04L 63/1408* (2013.01); *H04L 29/06* (2013.01)

(58) Field of Classification Search
CPC ............... G06C 30/02; G06C 30/0248; G06C 30/0201; G06C 30/0251; H04L 29/06; H04L 63/1408
USPC ............................................ 726/22
See application file for complete search history.

(56) References Cited

U.S. PATENT DOCUMENTS

| | | | |
|---|---|---|---|
| 2008/0140626 A1* | 6/2008 | Wilson | G06F 17/30864 |
| 2008/0147456 A1* | 6/2008 | Broder | G06Q 30/0248 |
| | | | 705/14.47 |
| 2008/0281606 A1* | 11/2008 | Kitts | G06Q 30/02 |
| | | | 705/1.1 |

(Continued)

OTHER PUBLICATIONS

Notification of Transmittal of The International Search Report and The Written Opinion of the International Searching Authority, or The Declaration dated Jul. 20, 2015 of corresponding International Patent Application No. PCT/US15/41123.

(Continued)

*Primary Examiner* — Jeffrey Pwu
*Assistant Examiner* — Samuel Ambaye
(74) *Attorney, Agent, or Firm* — Smith, Gambrell & Russell, LLP

(57) ABSTRACT

The present invention provides improved techniques that can be used to verify illegitimate non-human users that are accessing content. For example, a method of verifying a non-human user of a computerized device may comprise receiving information identifying a potential non-human user of a computerized device, altering a browser page to be used by the potential non-human user, and verifying whether or not the potential non-human user is an actual non-human user based on a behavior of the potential non-human user with the altered browser page.

12 Claims, 3 Drawing Sheets

(56) References Cited

U.S. PATENT DOCUMENTS

2012/0323700 A1   12/2012   Aleksandrovich et al.
2013/0091027 A1    4/2013   Lin

OTHER PUBLICATIONS

Notification Concerning Transmittal of International Preliminary Report on Patentability, dated Feb. 2, 2017.
PCT International Preliminary Report on Patentability (Form PCT/IB/373) in corresponding International Application No. PCT/US2015/041123, dated Jan. 24. 2017.

* cited by examiner

SYSTEM AND METHOD FOR VERIFYING NON-HUMAN TRAFFIC

BACKGROUND OF THE INVENTION

1. Field of the Invention

The present invention relates to verifying illegitimate non-human users that are accessing content.

2. Description of the Related Art

In the past few years, there has been a significant increase in the number of automated non-human user software, known as "bots", browsing the internet. Some of these bots are used for legitimate purposes to analyze and classify content across the World Wide Web. For example, GOOGLE® uses bots to gather content to be indexed for their search services. However, some other types of bots are used for illegitimate and many times for fraudulent purposes. One such illegitimate usage is the artificial inflation of impression counts (number of times an advertisement is viewed) and/or impression clicks (number of times an advertisement is clicked) in order to fraudulently profit from getting paid based on those inflated numbers.

These bots are very difficult to identify because they may originate from a server farm or from regular user computers, computers that real and unsuspecting humans use to legitimately view web pages or other types of digital content. The bots can spread and infect a computer through malware, adware, malvertising, viruses, plugins, email attachments, apps, websites, or through any other means. Further, once potential bots are identified, it is important to verify that that the potential bot actually is a bot and hasn't been misidentified.

A need arises for effective techniques that can be used to verify illegitimate non-human users that are accessing content.

SUMMARY OF THE INVENTION

The present invention provides improved techniques that can be used to verify illegitimate non-human users that are accessing content.

For example, a method of verifying a non-human user of a computerized device may comprise receiving information identifying a potential non-human user of a computerized device, altering a browser page to be used by the potential non-human user, and verifying whether or not the potential non-human user is an actual non-human user based on a behavior of the potential non-human user with the altered browser page.

The browser page may be altered by replacing at least one advertisement on the browser page with a decoy advertisement which a human user is unlikely to click on. For example, the decoy advertisement may be a blank advertisement, a hidden advertisement that would not be seen by a human user, an advertisement that is visible and not hidden, but not very likely to be clicked on by a human, or an advertisement may contain a message that will trigger certain behavior from a human but not from a non-human user. The browser page may be altered by changing a page to which the browser is redirected to when an advertisement is clicked on to a page that would be confusing to a non-human user, but easily navigated by a human user, or would entice different behavior between a non-human user and a human user. The page to which the browser is redirected may include a CAPTCHA® or other challenge-response test, which a human user can navigate but a non-human user is unlikely to be able to complete, at least one invisible link that a user will not see, and therefore never click on, but an automated bot is likely to click on, invisible text that a human user will not see but a non-human user will read, text in an image that a human user will read but a non-human user will not, hidden form fields that a human user won't fill out but a non-human user is likely to fill out, or any combination thereof.

DETAILED DESCRIPTION OF THE INVENTION

Figure 1:
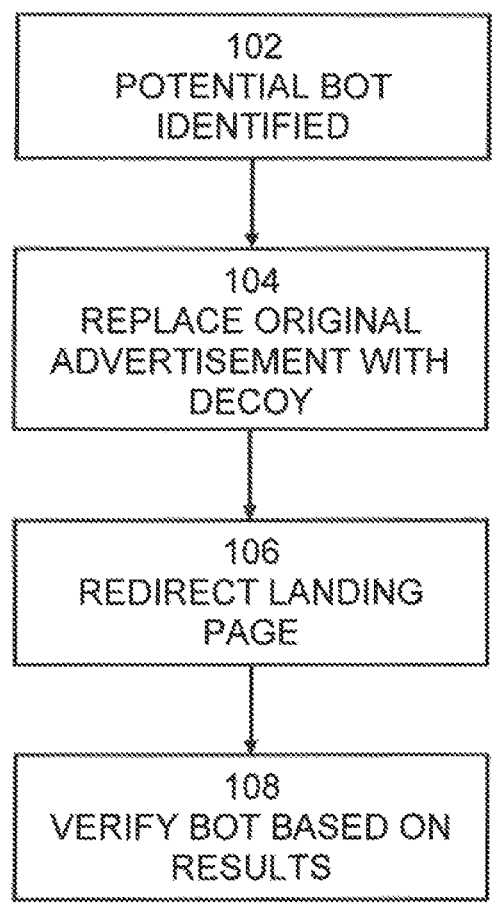
FIG. 1 is an exemplary flow diagram of an embodiment of a process for verifying one or a group of automated bots.

One embodiment of the present invention provides improved and effective techniques that can be used to verify illegitimate non-human users that are accessing content.

A number of techniques have been suggested to identify a potential automated bot within a random set of user browsers. The next step is to verify that browsers identified as automated bots are indeed bots. It is to be noted that the described verification techniques contemplate use with any techniques for identifying potential bots.

The verification process is important for several reasons. For example, when advertisers transact and pay for the ads that have been delivered, fees for those ads delivered to automated bots are usually deducted from the advertising fees. Therefore, it is essential to confirm that those bots are recognized appropriately and legitimate users haven't been inadvertently identified as bots. In addition, learning algorithms take a previously identified set of bots and non bots and use them to enhance their learning and improve the algorithms. If the data is too "noisy", the quality of the algorithms is reduced.

To understand how bots can be validated, one must understand the online advertising business model and how bots can be programmed. Online advertising in typically transacted in a number of different fashions:

1) Pay per impression (CPM)—the advertiser pays for every ad delivered to the browser.

2) Pay per click (CPC)—the advertiser pays only when an ad was delivered AND clicked on.

3) Pay per conversion (CPA)—the advertiser pays only when the user completes a predefined transaction such as sign up for a service, purchase an item on the website, fill out a form, etc.

4) Pay per viewable impression—the advertiser pays for every ad delivered to the browser and viewed by the user.

5) Pay per viewable video ad—the advertiser pays for every video ad delivered to the browser and viewed by the user.

The first model (CPM) is very easy fir an automated bot to mimic since by merely visiting a web page the ad would load and get delivered. A bot can therefore be programmed to visit a large number of pages per day on a specific list of websites to inflate the number of impressions served. To decrease suspicion and make it look as if this is legitimate user traffic, many thousands or hundreds of thousands of different bots can be used from different computers, each only generating a small number of page views per day on each of the websites. The websites visited by the bots are either owned by the bot operators, therefore profiting from this scheme, or owned by others that are paying the bot operators to drive incremental "visitors" to their website (many times unaware that these new "visitors" are bots not humans).

The second model (CPC) is not too complex for an automated bot to mimic since all it needs to do to get paid is to simulate a click on an ad once the ad loads. This model would work similar to the first, however, the bot would also click on the ad when it loads, or to decrease suspicion, would only click on one of every few ads that load.

The third model (CPA), however, is more complex for a bot to mimic since it can differ by campaign and may require the bot to fill out complicated fields and inputs. However, as bots gets more sophisticated, more and more of them are expected to be able to mimic this model as well.

The fourth model (pay per viewable impression) depends to some extent on how the viewable is defined, as there are different ways it may be defined. For example, one definition is that at least 50% of the advertisement's creative portion is displayed within the active browser viewport for at least 1 second. There are other definitions as well. This model is easy for an automated bot to mimic, by visiting the web page, waiting for the content to load, scrolling to the position of the ad so that it is in the active browser viewport, and waiting for a certain time to elapse.

The fifth model (pay per viewable video advertisement) also depends to some extent on how viewable is defined, as there are different ways it may be defined. For example, one definition is that at least 50% of the video's creative portion is displayed within the active browser viewport for at least 2 seconds. There are other definitions as well. This model may be slightly more difficult for an automated bot to mimic depending on the implementation. If the video auto-plays (starts playing automatically upon load), it could be mimicked by the bot just by visiting the web page, waiting for the video to load, scrolling to the position of the video so that it is in active browser viewport, and waiting for a certain time to elapse. If the video is user initiated (user needs to click on a "play" button for the video to start playing), it requires to bot visit the web page, scroll to the position of the ad so that it is in active browser viewport, identify and click on the play button, and then wait for a certain time to elapse after the video ad starts playing.

Legitimate users' behavior differs from that of bots in a number of ways. For example, legitimate users typically generate fewer impressions, significantly less clicks and lower click through rates. However, once they click, the ratio of clicks to conversions is significantly higher than a bot. These observed differences can be used for validation.

Figure 2:
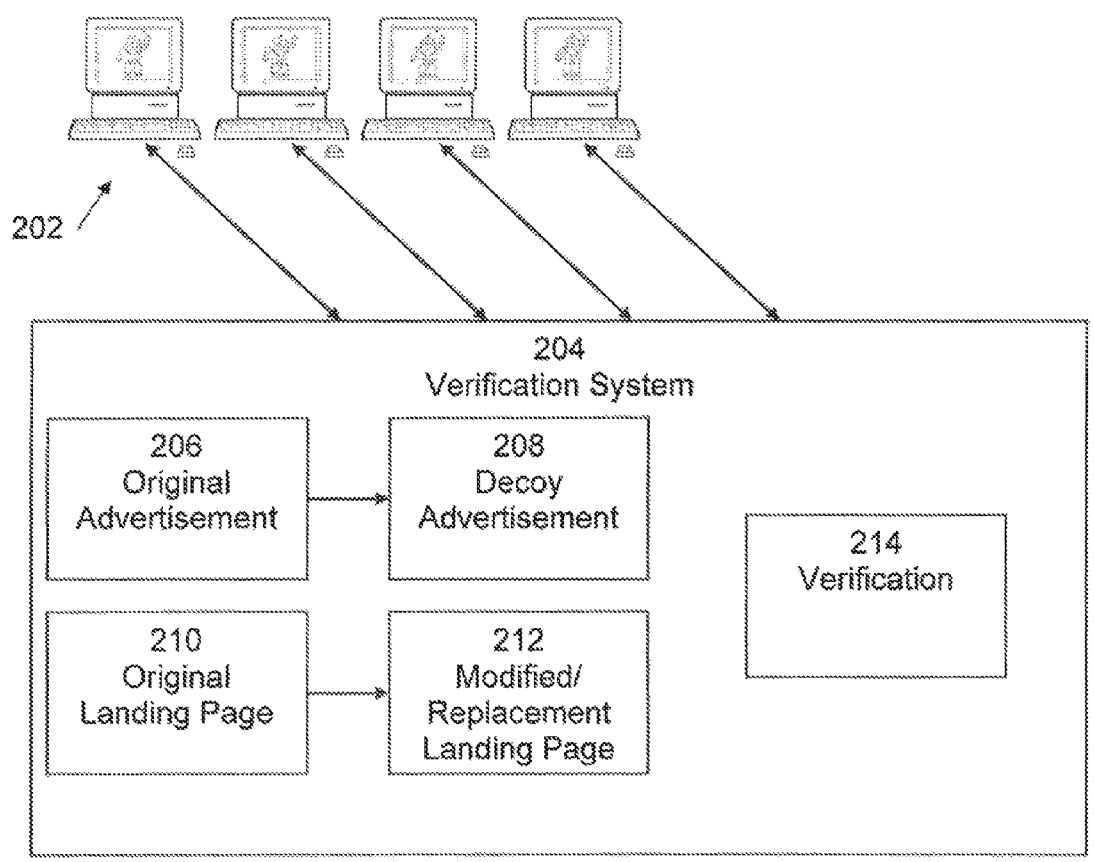
FIG. 2 is an exemplary flow diagram of an embodiment of an exemplary block diagram of a system for verifying automated bots.

An example of a process 100 verifying one or a group of automated bots is shown in FIG. 1. It is best viewed in conjunction with FIG. 2, which is an exemplary block diagram of a system for verifying automated bots. Turning briefly to FIG. 2, a plurality of user systems 202 that have been identified as containing potential bots are shown. User systems 202 are communicatively connected to verification system 204, which performs the steps of process 100.

Returning to FIG. 1, in step 102, a user system 202 containing a potential bot is identified. Examples of techniques for identifying potential bots are described in U.S. patent application Ser. No. 14/315,430, filed Jun. 26, 2014. It is noted that the techniques described therein are merely examples, and that the present invention contemplates any and all techniques for identifying potential bots.

In step 104, the original advertisement 206 that is being delivered may be replaced with a decoy 208 advertisement which a human is very unlikely to click on. For example, a human is very unlikely to click on a blank advertisement while a bot will typically not be able tell the difference and still click on the advertisement. Alternatively, the advertisement could be "hidden" using a hidden visibility property. A human would not see the advertisement but a bot would "see" it because of the methodology bots use to detect advertisements. Replacing the advertisement in real-time can be done by the advertiser advertisement server or any intermediary in the advertisement delivery chain.

As an alternative to step 104, or in addition to step 104, in step 106 the original landing page 210 (the page to which the browser is redirected when the advertisement is clicked on) may be modified or replaced with a page 212 that would be confusing to an automated bot but easily navigated by a human, or which would entice different behavior between bots and humans. For example, the modified or replacement landing page may include:

A challenge-response test to determine whether or not the user is human, such as a CAPTCHA®, which a human user can navigate but a bot is unlikely to be able to complete.

Invisible links on the page that a user will not see, and therefore never click on, but an automated bot is likely to click on.

Text in an image that a user will read but a bot will not.

Hidden form fields that a user won't fill out but a bot is likely to fill out.

Any combination of the above.

In step 108, the potential bot is verified 214 as an actual bot based on the results of steps 104 and 106. For example, in step 104, clicking on the modified advertisement (such as a blank or hidden advertisement) and then failing to pass the modified or replacement landing page in step 106 would indicate a bot. Steps 104 and 106 may be used separately or together and may be used multiple times to increase the confidence level of the verification.

Figure 3:
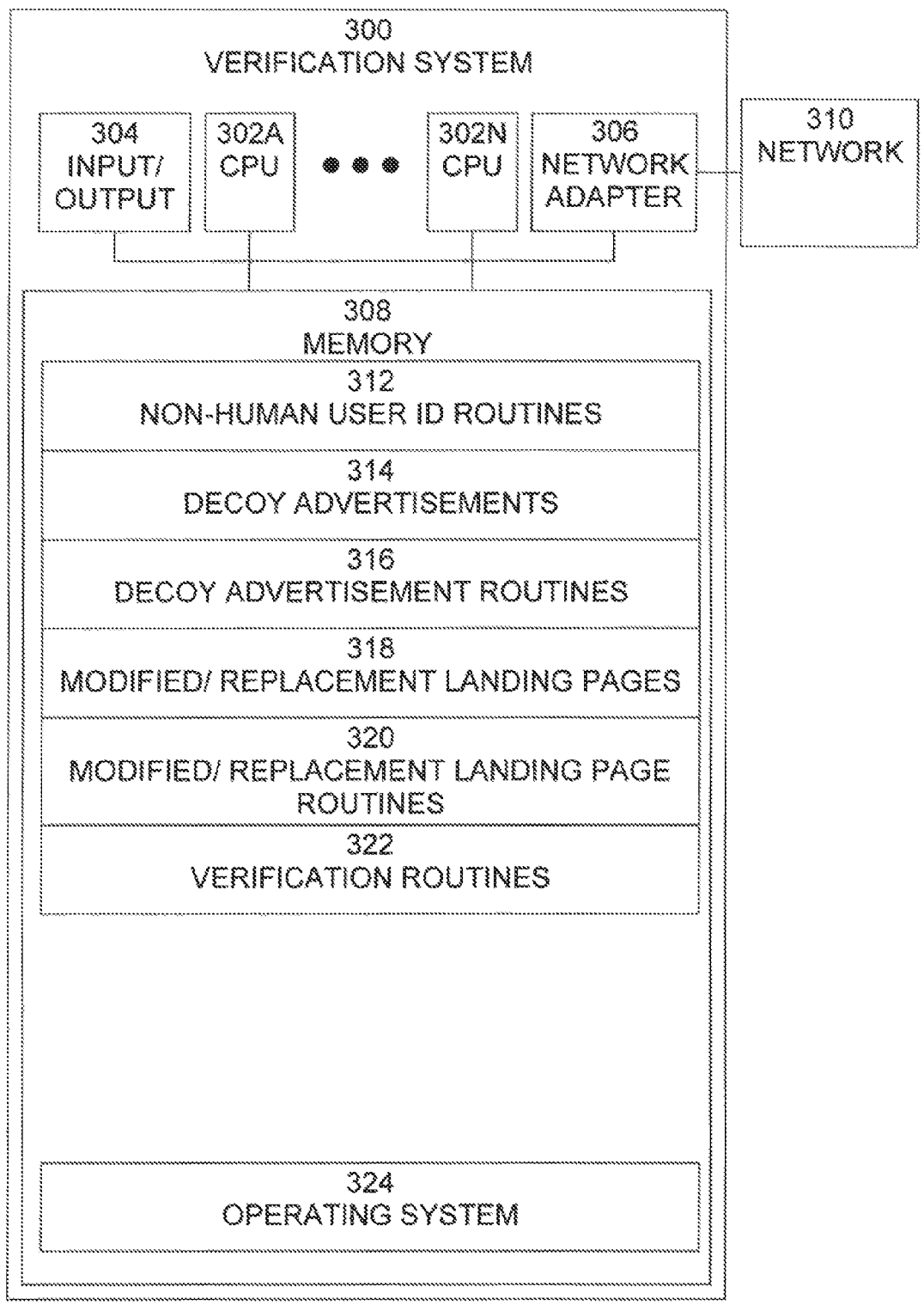
FIG. 3 is an exemplary block diagram of an embodiment of a system for verifying automated bots.

An exemplary block diagram of a verification system 300, such as a verification system shown in FIG. 2, is shown in FIG. 3. Verification system 300 is typically a programmed general-purpose computer system, such as a personal computer, tablet computer, mobile device, workstation, server system, minicomputer, mainframe computer, etc. Verification system 300 includes one or more processors (CPUs) 302A-302N, input/output circuitry 304, network adapter 306, and memory 308. CPUs 302A-302N execute program instructions in order to carry out the functions of the present invention. Typically, CPUs 302A-302N are one or more microprocessors, such as an INTEL PENTIUM® processor. FIG. 3 illustrates an embodiment in which verification system 300 is implemented as a single multi-processor computer system, in which multiple processors 302A-302N share system resources, such as memory 308, input/output circuitry 304, and network adapter 306. However, the present invention also contemplates embodiments in which user verification system 300 is implemented as a plurality of networked computer systems, which may be single-processor computer systems, multi-processor computer systems, or a mix thereof.

Input/output circuitry 304 provides the capability to input data to, or output data from, verification system 300. For example, input/output circuitry may include input devices, such as keyboards, mice, touchpads, trackballs, scanners, etc., output devices, such as video adapters, monitors, printers, etc., and input/output devices, such as, modems, etc.

Network adapter 306 interfaces user device 300 with a network 310. Network 310 may be any public or proprietary LAN or WAN, including, but not limited to the Internet.

Memory 308 stores program instructions that are executed by, and data that are used and processed by, CPU 302 to perform the functions of verification system 300. Memory 308 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 308 vary depending upon the function that verification system 300 is programmed to perform. In the example shown in FIG. 3, exemplary memory contents for a for an analysis system are shown. However, one of skill in the art would recognize that these functions, along with the memory contents related to those functions, may be included on one system, or may be distributed among a plurality of systems, based on well-known engineering considerations. The present invention contemplates any and all such arrangements.

In the example shown in FIG. 3, memory 308 may include non-human user id routines 312, decoy advertisements 314, and decoy advertisement routines 316, modified/replacement landing pages 318, modified/replacement landing page routines 320, verification routines 322, and operating system 324. Non-human user id routines 312 may be used to identify user systems that contain a potential bot. Decoy advertisements 314 may be replacements for original advertisements that are being delivered and which a human is very unlikely to click on. Decoy advertisement routines 316 may be used to generate and/or supply decoy advertisements 314. Modified/replacement landing pages 318 may be pages that would be confusing to an automated bot but easily navigated by a human, or which would entice different behavior between bots and humans. Modified/replacement landing page routines 320 may be used to generate and/or supply modified/replacement landing pages 318. Verification routines 322 may be used to verify the potential bot as an actual bot based on the results of the decoy advertisements 314 and/or the modified/replacement landing pages 318. Operating system 324 provides overall system functionality.

As shown in FIG. 3, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multitasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while aspects of the present invention may be implemented in the context of a fully functioning data processing system, those of ordinary skill in the art will appreciate that the processes of the present invention are capable of being distributed in the form of a computer program product including a computer readable medium of instructions. Examples of non-transitory computer readable media include storage media, examples of which include, but are not limited to, floppy disks, hard disk drives, CD-ROMs, DVD-ROMs, RAM, and, flash memory.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of verifying a non-human user of a computerized device comprising:

receiving information identifying a potential non-human user of a computerized device;

altering a browser page to be used by the potential non-human user by including at least one of the following: at least one invisible link that a user will not see, and therefore never click on, but an automated bot is likely to click on; text in an image that a human user will read but a non-human user will not; hidden form fields that a human user won't fill out but a non-human user is likely to fill out, or any combination thereof;

verifying whether or not the potential non-human user is an actual non-human user based on a behavior of the potential non-human user with the altered browser page;

wherein the browser page is altered by replacing at least one advertisement on the browser page with a decoy advertisement which a human user is unlikely to click on and wherein the decoy advertisement is a blank advertisement, a hidden advertisement that would not be seen by a human user, an advertisement that is visible and not hidden, but not very likely to be clicked on by a human, or an advertisement may contain a message that will trigger certain behavior from a human but not from a non-human user.

2. The method of claim 1, wherein the browser page is altered by changing a page to which the browser is redirected to when an advertisement is clicked on to a page that would be confusing to a non-human user, but easily navigated by a human user, or would entice different behavior between a non-human user and a human user.

3. A system for verifying a non-human user of a computerized device, the system comprising a processor, memory accessible by the processor, and program instructions and data stored in the memory, the program instructions executable by the processor to perform:
  receiving information identifying a potential non-human user of a computerized device;
  altering a browser page to be used by the potential non-human user by including at least one of the following: at least one invisible link that a user will not see, and therefore never click on, but an automated bot is likely to click on; text in an image that a human user will read but a non-human user will not; hidden form fields that a human user won't fill out but a non-human user is likely to fill out, or any combination thereof;
  verifying whether or not the potential non-human user is an actual non-human user based on a behavior of the potential non-human user with the altered browser page;
  wherein the browser page is altered by replacing at least one advertisement on the browser page with a decoy advertisement which a human user is unlikely to click on and
  wherein the decoy advertisement is a blank advertisement, a hidden advertisement that would not be seen by a human user, an advertisement that is visible and not hidden, but not very likely to be clicked on by a human, or an advertisement may contain a message that will trigger certain behavior from a human but not from a non-human user.

4. The system of claim 3, wherein the browser page is altered by changing a page to which the browser is redirected to when an advertisement is clicked on to a page that would be confusing to a non-human user, but easily navigated by a human user, or would entice different behavior between a non-human user and a human user.

5. A computer program product for verifying a non-human user of a computerized device, the computer program product comprising a non-transitory computer readable medium storing program instructions that when executed by a processor perform:
  receiving information identifying a potential non-human user of a computerized device;
  altering a browser page to be used by the potential non-human user by including at least one of the following: at least one invisible link that a user will not see, and therefore never click on, but an automated bot is likely to click on; text in an image that a human user will read but a non-human user will not; hidden form fields that a human user won't fill out but a non-human user is likely to fill out, or any combination thereof;
  verifying whether or not the potential non-human user is an actual non-human user based on a behavior of the potential non-human user with the altered browser page;
  wherein the browser page is altered by replacing at least one advertisement on the browser page with a decoy advertisement which a human user is unlikely to click on and
  wherein the decoy advertisement is a blank advertisement, a hidden advertisement that would not be seen by a human user, an advertisement that is visible and not hidden, but not very likely to be clicked on by a human, or an advertisement may contain a message that will trigger certain behavior from a human but not from a non-human user.

6. The computer program product of claim 5, wherein the browser page is altered by changing a page to which the browser is redirected to when an advertisement is clicked on to a page that would be confusing to a non-human user, but easily navigated by a human user, or would entice different behavior between a non-human user and a human user.

7. The method of claim 1, wherein the browser page to be used by the potential non-human user is altered by including at least one invisible link that a user will not see, and therefore never click on, but an automated bot is likely to click on, invisible text that a human user will not see but a non-human user will read, text in an image that a human user will read but a non-human user will not, and hidden form fields that a human user won't fill out but a non-human user is likely to fill out.

8. The system of claim 3, wherein the browser page to be used by the potential non-human user is altered by including at least one invisible link that a user will not see, and therefore never click on, but an automated bot is likely to click on, invisible text that a human user will not see but a non-human user will read, text in an image that a human user will read but a non-human user will not, and hidden form fields that a human user won't fill out but a non-human user is likely to fill out.

9. The computer program product of claim 5, wherein the browser page to be used by the potential non-human user is altered by including at least one invisible link that a user will not see, and therefore never click on, but an automated bot is likely to click on, invisible text that a human user will not see but a non-human user will read, text in an image that a human user will read but a non-human user will not, and hidden form fields that a human user won't fill out but a non-human user is likely to fill out.

10. The method of claim 2, wherein the browser page to be used by the potential non-human user is altered by including at least one invisible link that a user will not see, and therefore never click on, but an automated bot is likely to click on, invisible text that a human user will not see but a non-human user will read, text in an image that a human user will read but a non-human user will not, and hidden form fields that a human user won't fill out but a non-human user is likely to fill out.

11. The system of claim 4, wherein the browser page to be used by the potential non-human user is altered by including at least one invisible link that a user will not see, and therefore never click on, but an automated bot is likely to click on, invisible text that a human user will not see but a non-human user will read, text in an image that a human user will read but a non-human user will not, and hidden form fields that a human user won't fill out but a non-human user is likely to fill out.

12. The computer program product of claim 6, wherein the browser page to be used by the potential non-human user is altered by including at least one invisible link that a user will not see, and therefore never click on, but an automated bot is likely to click on, invisible text that a human user will not see but a non-human user will read, text in an image that a human user will read but a non-human user will not, and hidden form fields that a human user won't fill out but a non-human user is likely to fill out.

* * * * *